United States Patent [19]

Terasawa

[11] Patent Number: 4,636,814

[45] Date of Patent: Jan. 13, 1987

[54] PRINTING APPARATUS

[75] Inventor: Koji Terasawa, Mitaka, Japan

[73] Assignee: Canon Kabushiki Kaisha, Tokyo, Japan

[21] Appl. No.: 820,925

[22] Filed: Jan. 21, 1986

Related U.S. Application Data

[63] Continuation of Ser. No. 635,516, Jul. 30, 1984, abandoned.

[30] Foreign Application Priority Data

| | | | |
|---|---|---|---|
| Aug. 2, 1983 | [JP] | Japan | 58-140598 |
| Dec. 15, 1983 | [JP] | Japan | 58-235052 |
| Dec. 15, 1983 | [JP] | Japan | 58-235053 |
| Dec. 15, 1983 | [JP] | Japan | 58-235054 |
| Dec. 15, 1983 | [JP] | Japan | 58-235055 |

[51] Int. Cl.⁴ .......... G01D 15/18
[52] U.S. Cl. .......... 346/140 R
[58] Field of Search .......... 346/140, 75

[56] References Cited

U.S. PATENT DOCUMENTS

| | | | |
|---|---|---|---|
| 4,178,595 | 12/1979 | Jinnai | 346/140 |
| 4,187,511 | 2/1980 | Robinson | 346/140 X |
| 4,342,042 | 7/1982 | Cruz-Uribe | 346/140 |
| 4,432,005 | 2/1984 | Duffield | 346/140 |
| 4,475,116 | 10/1984 | Sicking | 346/140 |

*Primary Examiner*—Joseph W. Hartary
*Attorney, Agent, or Firm*—Fitzpatrick, Cella, Harper & Scinto

[57] ABSTRACT

An ink-jet printer has a tank holding ink therein, an ink-jet printing head for printing on a paper sheet, an ink cartridge for holding a supply ink, electrodes for detecting an ink level in the tank, a feeder for feeding the ink in the ink cartridge to the tank when the electrodes detect that the ink level in the tank is below a predetermined level, a timer circuit for allowing the feeder to supply an extra amount of ink to the tank even after the ink level reaches a normal level, and a warning device for warning the operator if the ink level is not recovered to the normal level within a predetermined period of time after the feeder is operated.

8 Claims, 9 Drawing Figures

PRINTING APPARATUS

This application is a continuation of application Ser. No. 635,516 filed July 30, 1984, now abandoned.

BACKGROUND OF THE INVENTION

1. Field of the Invention

The present invention relates to a printing apparatus which prints on a printing medium by transferring droplets of an ink held in an ink storage container such as an ink cartridge.

2. Description of the Prior Art

Various types of printers which print with a liquid ink in place of ink ribbons and the like have recently been proposed. In the field of output devices for computer systems, such ink-jet printers are becoming prevalent.

In an ink-jet printer, the volume of a nozzle is changed by a piezoelectric element so as to inject fine droplets of ink through an orifice at the distal end of the nozzle, thereby printing recording dots on a printing medium.

An ink-jet printer produces less noise than an impact printer. However, since the ink is in liquid form, handling of the ink is difficult in an ink-jet printer as compared to a printer which prints with an ink ribbon. Especially, some special mechanisms must be incorporated including a mechanism for preventing formation of bubbles or solids in an ink feed channel or recovery upon formation of such bubbles or solid, or a mechanism for guaranteeing reliable ink feed to a printing head.

FIG. 1 shows the structure of a printing head portion of a conventional ink-jet printer.

Referring to FIG. 1, a carriage 1 is reciprocated by a drive means (not shown) along a guide shaft 2 for printing. A printing unit 7 is mounted on the carriage 1. An ink-jet head 4 comprising a piezoelectric element as described above is arranged on a surface of the carriage 1 which faces a printing medium. Upon being driven, the ink-jet head 4 injects an ink in a tank 3 which a part of the printing unit 7 toward the printing medium.

The tank 3 is divided by a thin tube portion 3C into an ink storage portion having a vent hole 8 at the right, and an ink feed portion for the ink-jet head 4 at the left. The tank 3 has this construction so as to minimize the ink level fluctuation upon reciprocal movement of the carriage or formation of bubbles.

In a conventional printer, in order to feed ink to the ink-jet head 4 reliably, electrodes 5A and 5B are formed in the ink feed portion of the tank 3 for feeding the ink to the ink-jet head 4 and in the ink storage portion. Conduction between the electrodes 5A and 5B through the ink is detected by a comparator or the like to detect the ink level in the tank 3. Then, a warning LED 15 or the like mounted on the head or the like is turned on to signal to the operator the need for ink replenishment.

In the printer shown in FIG. 1, the electrode 5A at the left is arranged immediately above the ink-jet head 4. When an ink level 3A reaches an ink detection level 3B corresponding to the position of the electrode 5A, the warning LED 15 is turned on so as to signal to the operator a decrease in the ink level.

Then, the operator opens an opening 9 of a replenishment cartridge 6 to replenish fresh ink into the tank 3 and to recover the ink level in the tank 3 to the normal level. However, bubbles may have formed inside the ink-jet head 4 due to a previous drop in the ink level. Therefore, the bubbles cannot be removed by only the pressure acting upon level increase in the tank 3. For this reason, the printing quality may be degraded for a short period of time after ink replenishment.

In addition to the decrease in the ink level upon frequent use of the printer, the ink level may also be decreased due to evaporation of water in the ink when the printer is not used for a long period of time. In this case, since the ink viscosity has increased, it is particularly difficult to remove bubbles by an increase in the ink level. It also takes a considerable period of time for the ink to recover the original viscosity.

In order to prevent formation of bubbles and an increase in the ink viscosity, it is preferable to keep the ink level 3A in the tank 3 as high as possible. However, when the ink detection level 3B is raised for this purpose in the tank of the conventional construction, the ink replenishment must be performed too frequently.

SUMMARY OF THE INVENTION

It is an object of the present invention to provide a printing apparatus which is capable of feeding ink without degrading printing quality.

It is another object of the present invention to allow automatic ink feed when an ink storage means such as an ink cartridge is mounted.

It is still another object of the present invention to increase the ink level to a suitable level when the ink level decreases.

It is still another object of the present invention to provide a plurality of warnings associated with ink feed with a single warning means.

It is still another object of the present invention to warn the operator when the ink level does not return to the normal level within a predetermined period of time after replacement of an ink storage means such as an ink cartridge.

It is still another object of the present invention to generate a warning when the ink level decreases and to release the warning when an ink storage means is replaced with a new one.

The above and other objects of the present invention will become apparent from the following description.

BRIEF DESCRIPTION OF THE DRAWINGS

FIGS. 8 and 9 show another embodiment of the present invention, in which FIG. 8 is a block diagram showing the overall structure, and FIG. 9 is a timing chart for explaining the mode of operation of this embodiment.

DETAILED DESCRIPTION OF THE PREFERRED EMBODIMENTS

Figure 1:
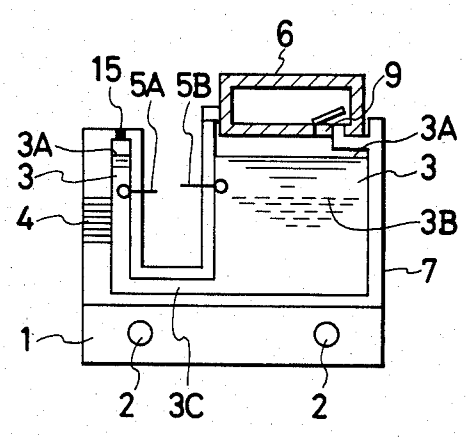
FIG. 1 PRIOR ART
FIG. 1 is a sectional view for explaining drawbacks of a conventional ink-jet printer.

The preferred embodiments of the present invention will be described below with reference to the accompanying drawings. In the following description, the present invention will be exemplified by an inkjet printer. In the embodiments to be described below, the same reference numerals as those used in FIG. 1 denote the same parts, and a detailed description thereof will be omitted.

Figure 2:
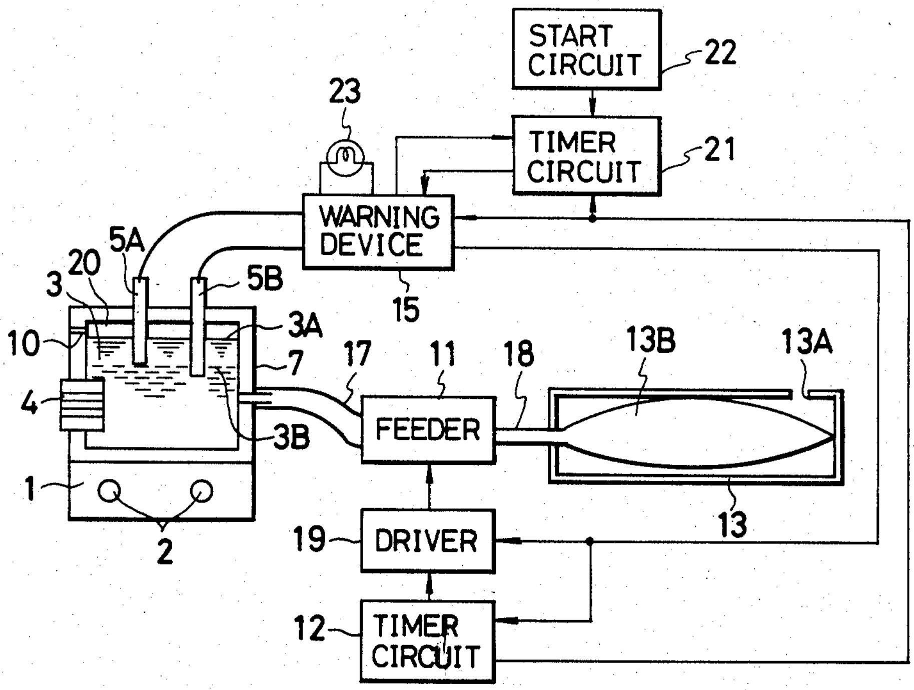
FIG. 2 is a block diagram showing the structure of an ink-jet printer according to an embodiment of the present invention.

FIG. 2 shows the schematic construction of an ink-jet printer according to an embodiment of the present invention.

Referring to FIG. 2, a printing unit 7 mounted on a carriage 1 serves to feed ink to an ink-jet head 4. The printing unit 7 furthermore has a shape and size so as not to cause formation of bubbles upon reciprocal movement of the carriage 1.

Pipes 17 and 18 are connected to a tank 3 as a first ink storage means. An ink portion stored in the tank 3 which has been used up at the ink-jet head 4 is replenished from an ink cartridge 13 as a second ink storage means to the tank 3 through these pipes 17 and 18. In this embodiment, a feeder 11 is arranged between the pipes 17 and 18 so as to recover normal injection or the normal ink level by feeding ink from the ink cartridge 13 to the tank 3 when the ink cannot be injected due to bubble formation in the ink-jet head 4 or the like or when the ink level in the tank 3 is lowered.

The feeder 11 can comprise a pump using a diaphragm in which the pressure feed portion is sealed or a tube pump in which the pressure feed portion is open. When a pump in which the pressure feed portion is sealed is used, during the non-operative period of the pump, a channel between the ink cartridge 13 and the tank 3 is communicated so as to allow replenishment of ink in the amount used up by the ink-jet head 4 from the ink cartridge 13. However, when the feeder 11 has a high precision of feeding amount, ink feed can be constantly performed including during printing.

Electrodes 5A and 5B as ink level detecting means project into the tank 3. These electrodes are mounted at levels such that the conduction resistance therebetween through the ink is reduced when the ink level 3A is reduced to the ink detection level 3B immediately above the ink-jet head 4. The electrodes 5A and 5B are connected to a warning device 15.

The warning device 15 comprises a comparator for detecting the resistance between the electrodes 5A and 5B and its peripheral logic circuit, or a microcomputer. The warning device 15 also includes a light emitting device 23 such as a lamp or an LED, and a warning output means comprising a buzzer or the like.

When the ink level 3A in the tank 3 reaches the ink detection level 3B, the warning device 15 drives the warning device and the light emitting device 23 to signal to the operator a decrease in the ink level. At the same time, a driver 19 drives the feeder 11 so as to feed ink in the ink cartridge 13 to the tank 3.

A timer circuit 12 is controlled by the warning device 15 such that it starts counting when the ink level inside the tank 3 increases upon ink replenishment by the feeder 11 and is detected to have reached the ink detection level 3B.

The timer circuit 12 thus determines the normal ON time of the feeder 11. The normal ON time of the feeder 11 is determined in accordance with the normal feed capacity such that the ink is supplied in the amount to reach from the ink detection level 3B to the normal level near a vent hole 10 at the upper portion of the tank 3. When the ink level decreases and the electrodes 5A and 5B no longer detect the ink level, the warning device 15 actuates the feeder 11. Upon the feeding operation of the feeder 11, the electrodes 5A and 5B detect the ink level again. However, the ink feed is not stopped immediately after detection of the ink level by the electrodes 5A and 5B. Instead, the feeder 11 is kept driven for a preset period of time in the timer circuit 12 and is thereafter stopped. An output signal from the timer circuit 12 is supplied to the warning device 15.

Figure 3:
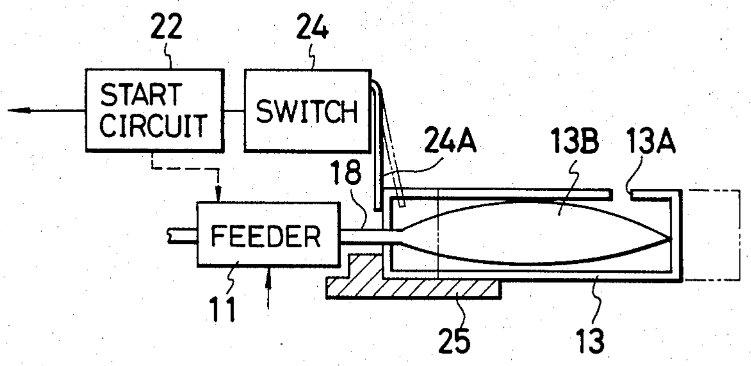
FIG. 3 is a partial sectional view showing details of the structure around an ink cartridge of the printer shown in FIG. 2.

A mechanism as shown in FIG. 3 is arranged to surround the ink cartridge 13.

The ink cartridge 13 consists of a case with a communication hole 13A, and an ink bag 13B of a plastic material or the like. Although not shown in detail, a hollow needle at the distal end of the pipe 18 extending from the feeder 11 described above is pierced into the ink bag 13B, thereby coupling the feeder 11 with the ink bag 13B. In FIG. 3, the ink cartridge 13 in this coupled state is illustrated with a solid line, while a state before coupling is illustrated with a dotted line.

When the ink cartridge 13 is to be replaced, the empty ink cartridge 13 is pulled from the pipe 18. Then, a new ink cartridge 13 holding ink therein is inserted toward a stopper of a mount base 25 from the position indicated by the dotted line until it is abutted against the stopper. Then, the new ink cartridge 13 is mounted on the pipe 18.

When the ink cartridge 13 is not mounted, an actuator 24A of a microswitch 24 is at the position indicated by the dotted line in FIG. 3. However, when the ink cartridge 13 is mounted, the actuator 24A is pressed by the head of the ink cartridge 13. Then, a signal is supplied to a start circuit 22 connected to the microswitch 24. In synchronism with the leading or trailing edge of the contact of the start circuit 22, that is, in synchronism with the mounting of the ink cartridge 13, the microswitch 24 produces a start signal. This output signal from the start circuit 22 is supplied to a timer circuit 21, as shown in FIG. 2, which then starts counting. The timer circuit 21 starts counting when the ink level 3A in the tank 3 is detected to be lower than the detection level 3B. When the ink level 3A in the ink 3 is raised upon driving of the feeder 11 and reaches the detection level 3B, the output from the timer circuit 21 is disabled by the driver 19.

A preset time $T_{MAX}$ in the timer circuit 21 is determined in accordance with the feeding capacity of the feeder 11 to be a maximum period of time upon which an empty ink cartridge 13 is detected if the ink level cannot be detected by the electrodes 5A and 5B after driving the feeder 11 for such a maximum period of time. In practice, this preset time $T_{MAX}$ can be determined to be a time period required for the feeder 11 to recover the empty ink 3 to the normal ink level. The timer circuit 21 is coupled through a bidirectional signal line, as shown in FIG. 2.

The mode of operation for the overall printer of the present invention will now be described.

Figure 4:
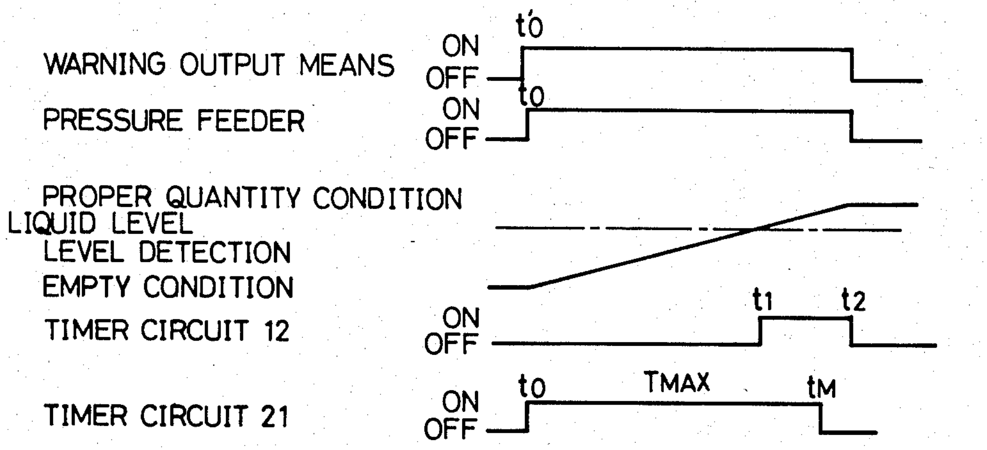
FIG. 4 is a timing chart for explaining the mode of operation of the embodiment of the present invention.

The operation will first be described referring to FIG. 4 with reference to a case wherein a sufficient amount of ink is left in the ink cartridge 13. FIG. 4 is a timing chart for explaining the operation of each part and changes in the ink level.

When the ink level 3A in the tank 3 shown in FIG. 2 corresponds the empty state at the left end, and the resistance of the electrodes 5A and 5B becomes infinite (nonconductive), this is detected by the electrodes 5A and 5B. A corresponding output turns on a warning output means such as a buzzer or a lamp (time $t'_0$) so as to warn the operator that the ink in the tank 3 is deficient and the feed operation will be performed. After a short time lag, the warning device 15 drives the feeder 11 through the driver 19 to start the ink feed operation. At the same time, the timer circuit 21 as the control means of the feeder 11 is turned on to start counting the maximum feed time $T_{max}$ (from time $t_0$).

In this case, since a sufficient amount of ink is left in the ink cartridge 13, the feeder 11 is driven to feed the ink from the ink cartridge 13 to the tank 3 through the pipe 18, the feeder 11, and the pipe 17. The ink level 3A is raised as shown in FIG. 4 and reaches the detection level 3B before the maximum feed time $T_{max}$ elapses.

When the ink level 3A reaches the detection level 3B, the lower end face of the electrode 5A contacts with the ink surface, and the electrodes 5A and 5B conduct through the ink at a resistance of several tens of kilo-ohms. This conduction is detected by the warning device 15.

Figure 5:
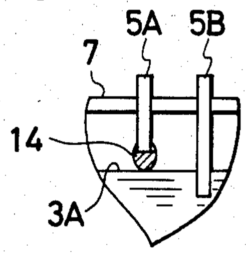
FIG. 5 is a view illustrating ink level detection.

In practice, residual ink 14 is frequently attached to the lower end of the electrode 5A as shown in FIG. 5. Therefore, before the ink level 3A reaches the detection level 3B, the lower end of the ink 14 contacts with the rising ink level 3A. Then, the electrodes 5A and 5B conduct before the ink level 3A reaches the detection level 3B.

When the ink level 3A is detected, the timer circuit 12 connected to the driver 19 is turned on (time $t_1$ in FIG. 4). The feeder 11 and the warning output means are kept to be ON until time $t_2$ at which the normal ON time preset in the timer circuit 12 elapses.

After the timer circuit 12 is turned on, the maximum feed time $T_{max}$ preset in the timer circuit 21 is neglected. Even if the maximum feed time $T_{max}$ counted from time $t_0$ elapses between times $t_1$ and $t_2$ and the timer circuit 21 is turned off, the feeder 11 and the warning output means are kept ON. Even if the maximum feed time $T_{max}$ counted from the time $t_0$ has elapsed after the time $t_2$, the feeder 11 and the warning output means are turned off at the time $t_2$.

Upon the ink feed operation from the time $t_1$ to $t_2$, the ink level 3A in the tank 3 is increased from the detection level 3B to a level corresponding to the vent hole 10.

Even if the ink level reaches the level of the vent hole 10, the vent hole 10 has a small diameter. Therefore, even if the ink enters the hole 10, it will not be scattered upon movement of the carriage 1 outside the tank 3 due to the surface tension acting on the ink.

When the ink level 3A in the tank 3 becomes lower than the detection level 3B after this operation for some reason, the above operation is repeated as long as the ink is left in the ink cartridge 13. When the feeder 11 is started, the timer circuit 21 is started. When the ink is detected by the electrodes during normal printing operation, the feeder 11 is driven for a time period determined by the timer circuit 12. After the driving of the feeder 11 is completed, the timer circuit 21 is reset by the warning device 15. During the ink replenishment, the feeder 11 is driven for the preset time of the timer circuit 12. The feeder 11 is not stopped immediately after the ink detection by the electrodes 5A and 5B. Therefore, upon a single operation, the ink level in the tank 3 can be raised to a predetermined level corresponding to the vent hole 10 as a capillary channel.

The operation will now be described referring to the timing chart shown in FIG. 6 with reference to a case wherein the ink cartridge 13 is empty.

When an ink level is detected to be below the detection level by the electrodes 5A and 5B, the light emitting device 23 is turned on at the time $t'_0$ shown in FIG. 6. At the same time, the warning device is turned on and the timer circuit 21 described above is started. After a short time lag inherent in the mechanism, the feeder 11 is started and is driven for the normal ON period preset in the timer circuit 21.

Figure 6:
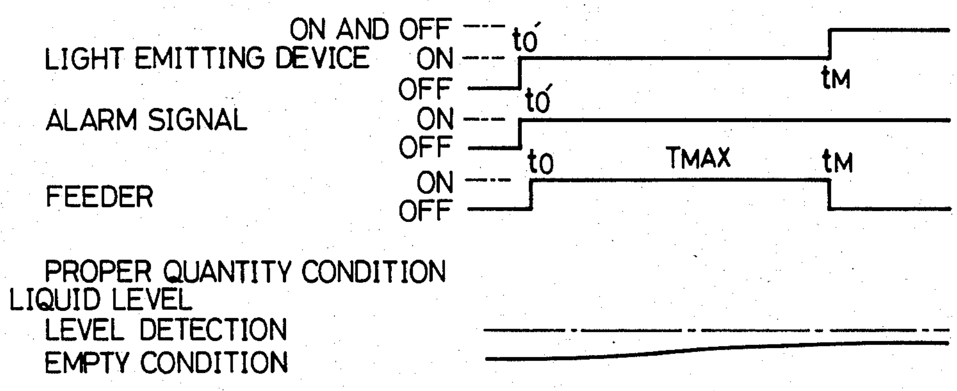
FIGS. 6 and 7 are timing charts for explaining the mode of operation of the embodiment of the present invention.

When there is substantially no ink remaining in the ink cartridge 13, the level increase in the tank 3 is very slow as indicated at the lowermost row in FIG. 6.

When the ink cannot be detected by the electrodes 5A and 5B, the feeder 11 is kept driven until the preset time $T_{MAX}$ of the timer circuit 21 elapses. During this preset time $T_{MAX}$, the warning device and the light emitting device 23 are driven.

When the ink cannot be detected by the electrodes 5A and 5B even after the preset time $T_{MAX}$ of the timer circuit 21 has elapsed, the warning device 15 stops driving the feeder 11 at time $t_M$ and changes the ON state of the light emitting device 24 to a flashing state. Thus, the operator is warned of a need for replacement of the ink cartridge 13. At this time, the warning device is kept operated, as shown in FIG. 6.

Figure 7:
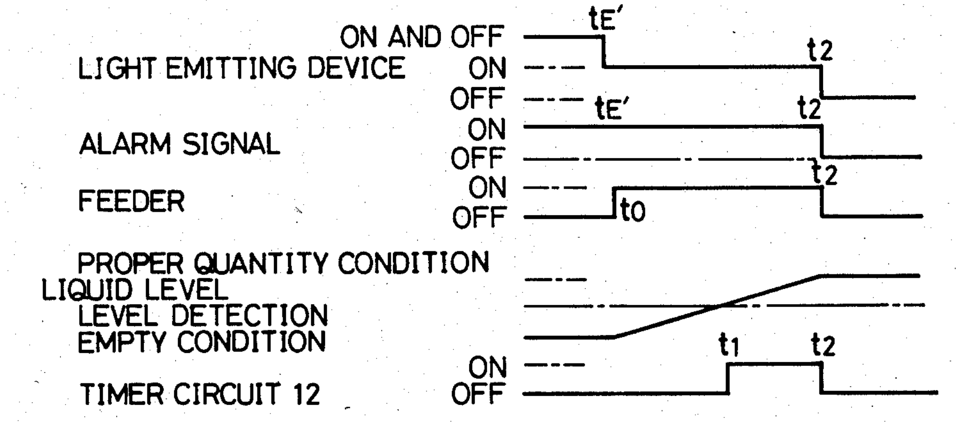

The operation will now be described referring to FIG. 7 with reference to a case wherein the ink cartridge 13 is replaced.

As shown in association with FIG. 6, a warning indicating an empty ink cartridge 13 is produced. The operation after the operator replaces the empty ink cartridge 13 with a new one is illustrated.

When the ink cartridge 13 is replaced with a new one, the microswitch 24 is actuated, and the start circuit 22 supplies a start signal to start the timer circuit 21. An output from the timer circuit 21 turns on the light emitting device 23 at time $t'_E$ shown in FIG. 7, the flashing warning a need for ink cartridge replacement is released, and the feeder 11 is started. As shown in the fourth row in FIG. 7, the timer 12 is started upon detection of the ink by the electrodes 5A and 5B at time $t_1$. The feeder 11, the light emitting device 23 and the warning device are kept driven until the time $t_2$ at which the time set in the timer circuit 12 ends.

Ink replenishment of the tank 3 is performed by replacing the ink cartridge 13, and the ink is replenished to a predetermined level by the feeder 11. At the same time, formation of bubbles or ink solidification can be prevented. During such an operation, the bubbles in the ink-jet head 4 are not removed by simply the ink level increase as in the conventional printer but are removed by the feeder 11 with reliability. When the ink is detected by the electrodes, the feeder is not immediately stopped but is stopped after a predetermined period of time to allow the ink level to reach a predetermined level. For this reason, even if the ink level in the tank 3 has decreased due to non-use of the printer for a long period of time, the ink can be readily fed to a predetermined level, and the noninjection of the ink from the nozzle can be prevented. Reliable printing can be performed immediately after the ink replenishment upon replacement of the ink cartridge 13.

Figure 8:
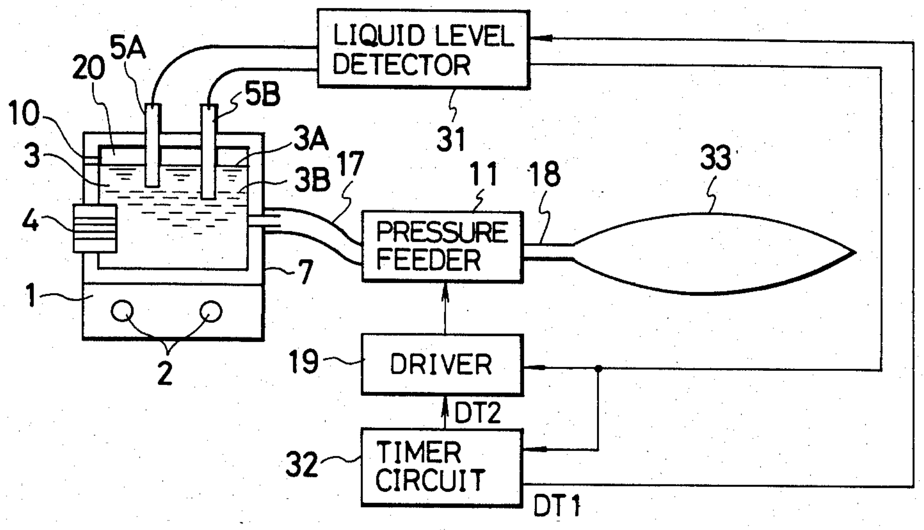
Figure 9:
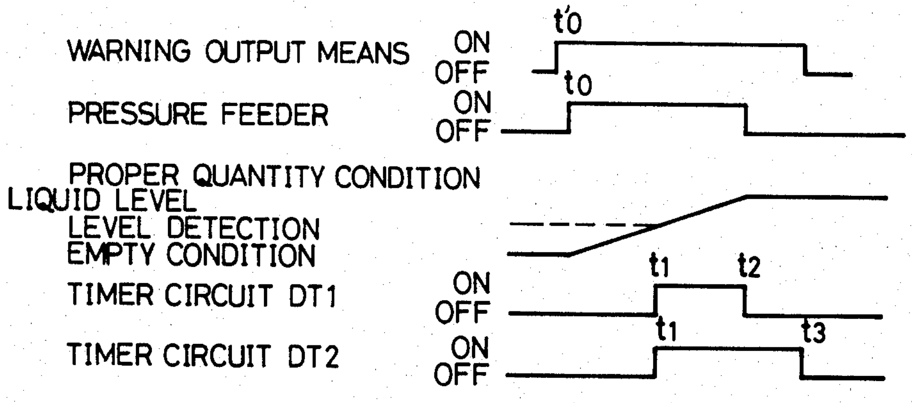

Another embodiment of the present invention will be described with reference to FIGS. 8 and 9. Referring to FIGS. 8 and 9, the same reference numerals as in FIGS. 1 to 7 denote the same parts. In this embodiment, electrodes 5A and 5B are connected to a liquid level detector 31. A means for detecting the ink amount comprises electrodes 5A and 5B and the liquid level detector 31. However, the detecting method may be another known method.

The liquid level detector 31 detects through the electrodes 5A and 5B an ink level 3A in a tank 3. A detection signal from the detector 31 causes a warning means therein to perform a warning operation. The detection signal also actuates a feeder 11 through a driver 19. The detector 31 comprises a comparator (not shown) for detecting the resistance between the electrodes 5A and 5B, and a logic circuit associated with it. A warning output means (not shown) such as a buzzer or a lamp is connected to the detector 31.

A timer circuit 32 as a control means for controlling the ON time of the feeder 11 and the warning output means is connected to the liquid level detector 31. First and second delay times DT1 and DT2 are preset in the timer circuit 32.

The first delay time DT1 is a time for keeping the feeder 11 driven from the detection of the level 3A at a detection level 3B after a warning and an ink feed operation upon a decrease in the ink level. This first delay time DT1 is preset to be the normal ON time of the feeder 11 which is required to feed an amount of ink which allows the ink level 3A in the tank 3 to reach from the detection level 3B to the level of a vent hole 10.

The second delay time DT2 is a time for keeping the warning output means driven from the detection time described above. The second delay time DT2 is preset to be longer than the first delay time DT1. The difference between the first and second delay times DT1 and DT2 is set to be a time required for a compressed air layer 20 to recover to the atmospheric pressure when the air layer 20 above the ink level 3A in the tank 3 is compressed by the increase in the ink level 3A.

The warning and ink feed operations of this embodiment having the above construction will be described with reference to FIG. 9. FIG. 9 is a timing chart for explaining the mode of operation of each part and the ink level changes of this embodiment. In this case, it is assumed that a sufficient amount of ink remains in an ink tank 33.

Assume a case wherein the ink level in the tank 3 is lowered and the tank 3 becomes empty as shown in FIG. 9 when the printer is not used for a long period of time or air is introduced. In this case, the resistance between the electrodes 5A and 5B becomes infinite (non-conductive), and this is detected by the liquid level detector 31. An output from the detector 31 then actuates the warning output means (time $t'_0$) so as to warn the operator that no more ink is left in the tank 3 and the ink feed operation is going to be performed.

After a short time lag, the output signal from the detector 31 turns on the feeder 11 through the driver 19 and the ink feed operation is started (time $t_0$).

In this case, since there is a sufficient amount of ink in the ink tank 33, the ink is fed from the ink tank 33 to the tank 3 through a pipe 18, the feeder 11 and a pipe 17. The ink level 3A in the tank 3 is thus gradually increased. When the ink level 3A reaches the detection level 3B, the lower end face of the electrode 5A is brought into contact with the ink level surface. Then, the electrodes 5A and 5B are rendered conductive through the ink at a resistance of several tens of kiloohms, and this conduction is detected by the detector 31.

In practice, as shown in FIG. 5, residual ink 14 is attached to the lower end of the electrode 5A. Then, before the ink level 3A reaches the detection level 3B, the lower end of the ink 14 is brought into contact with the level 3A. Thus, the electrodes 5A and 5B are rendered conductive before the level 3A reaches the level 3B.

When the ink level 3A is detected, the output signal from the detector 31 turns on the timer circuit 32 (time $t_1$ in FIG. 9). The timer circuit 32 starts counting the first and second delay times DT1 and DT2.

The feeder 11 is enabled for the first delay time DT1 from the detection time $t_1$ and is turned off at the time $t_2$. The warning output means is enabled for the second delay time DT2 from the detection time $t_1$, the second delay time DT2 being longer than the first delay time DT1. The warning output means is turned off at time $t_3$ later than the time $t_2$.

Upon the ink feed operation from the time $t_1$ to $t_2$, the ink level 3A in the tank 3 is raised from the level 3B to the proper level corresponding to the level of the vent hole 10.

Even if the liquid or ink level reaches the vent hole 10, the vent hole 10 has a small diameter. Therefore, even if the ink enters the hole 10, it will not be scattered outside upon movement of the carriage or the like due to the surface tension.

When the increasing speed of the ink amount in the tank 3 by this feed operation is greater than the decrease rate of the air amount of an air layer 20 ejected from the tank 3 through the vent hole 10 or an ink jet head 4, the air layer 20 is compressed, and its pressure is raised above the atmospheric pressure.

When the pressure of the air layer 20 is increased above the atmospheric pressure, normal printing cannot be performed. During the time period between the feed operation end time $t_2$ and the warning operation end time $t_3$, the pressure of the air layer 20 is recovered to atmospheric pressure. Therefore, the operator is warned that printing cannot be performed during this time. When the warning operation ends, it is indicated that the printer is now in the normal state.

When the ink level 3A in the tank becomes lower than the detection level 3B after the warning and feed operations as described above, the above operation is repeated as long as there is a sufficient amount of ink remaining in the ink tank 33.

In accordance with the warning and feed operations of this embodiment, when the ink level 3A reaches the detection level 3B upon the feed operation, the feeder 11 is kept ON for the first delay time DT1 from the detection time. Therefore, the ink level 3A is raised above the detection level 3B.

The warning output means is kept on from the detection timing for the second delay time DT2 longer than the first delay time DT1.

The present invention is not limited to the embodiments described above. For example, the feeder 11 is interposed between the tank 3 and the ink cartridge 13. However, as a suction recovery device, the distal end of the ink-jet head 4 and the vent hole 10 can be drawn by suction so as to feed the ink in the ink cartridge 13 to the tank 3. If the ink cartridge 13 is arranged above the tank 3, the feeder 11 can be omitted and the ink can still be fed automatically. A means for controlling the ink feed can comprise an electromagnetic valve. When the ink cartridge is replaced while the ink level in the tank 3 is above the detection level 3B, the ink is not fed.

The buzzer in the warning device 15 of the embodiments described above can be turned on in the flashing state of the lamp 23 so as to provide a warning only in a truly abnormal state. The present invention is not limited to an ink-jet printer but can be applied to a printing apparatus which prints by charging an ink and attaching it onto a printing medium by electrical attraction, for example.

What is claimed is:

1. A printing apparatus comprising:

first ink storage means for storing ink;

printing means for printing by attaching on a printing medium droplets of the ink stored in said first ink storage means;

second ink storage means, detachably mounted on said printing apparatus, for storing ink;

feeding means adapted to be energized for feeding the ink in said second ink storage means to said first storage means;

sensing means for sensing the level of the ink in said first ink storage means and providing a sensing signal when the ink reaches a predetermined level as said feeding means is feeding ink to said first storage means;

timer means for timing a first predetermined interval initiated in response to the sensing signal and a second predetermined interval initiated with the energization of said feeding means, which second predetermined interval expires before the first predetermined interval if the first predetermined interval is being timed; and control means for controlling the energization and de-energization of said feeding means such that (a) said feeding means is energized if the level in said first ink storage means is below the predetermined level or in response to the initial mounting of said second ink storage means on said printing apparatus and (b) said feeding means is de-energized at the expiration of the first predetermined interval if the first predetermined interval is being timed and at the end of the second predetermined interval if the first predetermined interval is not being timed.

2. A printing apparatus according to claim 1, wherein:

said timer means includes a first timer for timing the first predetermined interval and providing a first timing signal at the expiration of the first predetermined interval; and the apparatus further comprising warning means for providing a warning signal that can be perceived by an operator, the warning signal being initiated in response to energization of said feeding means and terminated in response to the first timing signal.

3. A printing apparatus according to claim 2, wherein:

said timer means includes a second timer for timing the second predetermined interval and providing a second timing signal at the expiration of the second predetermined interval; and said warning means provides the warning signal in a first state in response to energization of said feeding means and in a second state in response to the second timing signal, unless said first timer has begun timing the first predetermined interval.

4. A printing apparatus according to claim 3, further comprising detection means for providing a detection signal in response to the initial mounting of said second ink storage means on said printing apparatus, wherein the warning signal goes from the second state to the first state in response to the detection signal.

5. A printing apparatus according to claim 3, wherein said warning means includes a lamp which is steadily lit in the first state and flashes in the second state.

6. A printing apparatus according to claim 1, wherein said timer means times a predetermined equalizing interval initiated with the initiation of the timing of the first predetermined interval and which is longer than the first predetermined interval.

7. A printing apparatus according to claim 6, wherein said first ink storage means includes a vent to atmosphere and the equalizing interval is chosen to enable the pressure in the interior of said first ink storage means to equalize with the atmosphere after ink is fed thereto.

8. A printing apparatus according to claim 7, further comprising warning means for providing a warning signal that can be perceived by an operator, the warning signal being initiated in response to energization of said feeding means and terminated in response to expiration of the equalizing interval.

* * * * *